United States Patent [19]
Ranganath et al.

[11] Patent Number: 5,471,117
[45] Date of Patent: Nov. 28, 1995

[54] LOW POWER UNITY POWER FACTOR BALLAST

[75] Inventors: Krishnappa Ranganath; Alexander Kurnia, both of Milwaukee, Wis.

[73] Assignee: MTI International, Inc., Menomonee Falls, Wis.

[21] Appl. No.: 241,058

[22] Filed: May 11, 1994

[51] Int. Cl.⁶ .................................................. H05B 41/16
[52] U.S. Cl. ................. 315/247; 315/204 R; 315/DIG. 7
[58] Field of Search ............................... 315/209 R, 224, 315/247, 307, DIG. 7

[56] References Cited

U.S. PATENT DOCUMENTS

| | | | |
|---|---|---|---|
| 4,352,045 | 9/1982 | Widmayer | 315/247 |
| 4,985,664 | 1/1991 | Nilssen | 315/209 R |
| 5,001,400 | 3/1991 | Nilssen | 315/209 R |
| 5,004,947 | 4/1991 | Nilssen | 315/224 |
| 5,012,161 | 4/1991 | Borwiec et al. | 315/247 |
| 5,051,662 | 9/1991 | Coonts | 315/209 R |
| 5,057,749 | 10/1991 | Nilssen | 315/247 |
| 5,099,407 | 3/1992 | Thorne | 363/37 |
| 5,115,347 | 5/1992 | Nilssen | 315/247 |
| 5,140,224 | 8/1992 | Kakitani et al. | 315/209 R |
| 5,148,360 | 9/1992 | Nguyen | 363/48 |
| 5,180,950 | 1/1993 | Nilssen | 315/127 |
| 5,258,692 | 11/1993 | Jones | 315/247 |
| 5,291,101 | 3/1994 | Chandrasekaran | 315/219 |
| 5,334,915 | 8/1994 | Ohsaki et al. | 315/244 |

FOREIGN PATENT DOCUMENTS 9011004  9/1990  WIPO ................................ 315/247

*Primary Examiner*—Robert J. Pascal
*Assistant Examiner*—Darius Gambino
*Attorney, Agent, or Firm*—Wells, St. John, Roberts, Gregory & Matkin

[57] ABSTRACT

An inverter circuit operating from line utilizes minimum, lower rating switches to operate at higher frequency, while maintaining substantially unity power factor and lower input current harmonics. The input rectified DC is transferred to a storage capacitor using a buck-boost regulator in which the current in inductor is always maintained discontinuous and proportional to the instantaneous input voltage. Filtering this input current will give substantially sinusoidal current at the input. The second switch in the buck-boost regulator and an additional third switch contributes to the necessary half bridge for an inverter. The inverter, which can be self oscillating or driven from a control circuitry, can give higher frequency, high voltage AC output with ability to control the load power hence provide for dimming, e.g. for a fluorescent lamp.

8 Claims, 7 Drawing Sheets

LOW POWER UNITY POWER FACTOR BALLAST

FIELD OF THE INVENTION

The invention relates generally to electronic ballasts for use with fluorescent lamps.

BACKGROUND OF THE INVENTION

An electronic ballast is a device which applies a high voltage across a fluorescent lamp to initiate an arc and start the lamp, and to limit current through the fluorescent lamp after the arc is initiated.

Most electronic ballasts include a output section including tuned LC resonant elements to achieve these functions. Some ballasts include input sections incorporating passive or active power factor correction.

An electronic ballast should provide high frequency high voltage supply to start the fluorescent lamp. After the lamp is started, it is possible that the power delivered to the lamp can be regulated by the ballast. In order to achieve this function, a substantially large DC input voltage is required, which results in the need for more expensive components with higher ratings or more complex control circuitry than if power regulation is not required.

Recently, there has been a push to use fluorescent lamps in residential applications, where incandescent lamps have typically been employed, in order to save energy. For example, commercially available PL lamps having screw in (or "Edison") bases can be used to replace incandescent lamps. These PL lamps typically have ratings of between 8 to 25 Watts. A low Watt fluorescent lamp provide illumination comparable to a higher Watt incandescent bulb, and thus saves energy. These PL lamps include a fluorescent tube and an electronic ballast circuit all in one screw in package. One commercially available PL lamp is a Philips Earth Light, model number SL 17/27. Because the electronic ballast circuitry in these lamps is disposable with the fluorescent tube when the tube burns out, it is desirable to keep the cost of the circuit components in the ballast low. A problem with these PL lamps is that they produce significant harmonic distortion, which results in increased costs to utility companies. Another problem with these PL lamps is that they have low power factor ratings; e.g., less than 0.7.

Another fluorescent lamp adapted for home use is a two pin fluorescent lamp which is used with a PL lamp adaptor, which adaptor contains a ballast circuit. An example of a commercially available two pin fluorescent lamp is a Philips model PLC15MM. An example of a commercially available adaptor for such a two pin lamp, containing a ballast, is a Lights of America PL lamp adaptor model 550 g.

Most prior art patents relating to electronic ballasts disclose circuits employing what is known as a boost mode of operation., wherein output voltage is always higher than input voltage, or passive L-C circuitry for power factor correction. For example, U.S. Pat. No. 5,001,400, issued to Nilssen on Mar. 19, 1991 and incorporated herein by reference, discloses boost mode power factor correction circuitry. U.S. Pat. No. 4,985,664, issued to Nilssen on Jan. 15, 1991 and incorporated herein by reference, discloses a forward converter topology. U.S. Pat. No. 5,258,692, issued to Jones on Nov. 2, 1993; U.S. Pat. No. 5,148,360, issued to Nguyen on Sep. 15, 1992; U.S. Pat. No. 5,057,749, issued to Nilssen on Oct. 15, 1991; U.S. Pat. No. 5,012,161 issued to Borowiec et al on Apr. 30, 1991; U.S. Pat. No. 5,099,407, issued to Thorne on Mar. 24, 1992; U.S. Pat. No. 5,180,950, issued to Nilssen on Jan. 19, 1993; and U.S. Pat. No. 5,004,947, issued to Nilssen on Apr. 2, 1991, all of which are incorporated herein by reference, all disclose passive correction.

Ballasts including self oscillating output circuits are known in the art.

SUMMARY OF THE INVENTION

The inventors of the present invention have recognized that none of the prior art patents disclose effective switch utilization and reduced bus voltage in a power factor corrected electronic ballast.

The invention provides an electronic ballast for a fluorescent lamp which utilizes switches and operates in buck boost mode. The term buck boost is known to those skilled in the art as relating to circuitry wherein output voltage can be either higher than or lower than input voltage. A problem associated with switch rating in the buck boost regulator is removed by using two switches in series wherein the second switch can also be the bottom switch of half bridge inverter.

The invention employs AC to DC conversion using buck-boost topology. During this conversion from AC to DC, because inductor current is always maintained to be discontinuous, the filtered input current should follow the input voltage. The output inverter is a half-bridge driven inverter with a tuned L-C output circuit. The ballast circuit employs two stage conversion, but with single control element. During the absence of the load the operation of the inverter can be interrupted by means of duty cycle control and thus avoid unnecessary loss in the output circuit.

In one embodiment of the invention, an electronic ballast is provided including circuitry which is selected to accept 50% duty cycle from the control circuitry in which case the circuitry can self oscillate with a transformer replacing the control circuit.

By varying the duty cycle, the total energy delivered to the tuned L-C circuit can be varied and, thus, load regulation or DC voltage control can be achieved, allowing dimming of the fluorescent lamp.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 1:
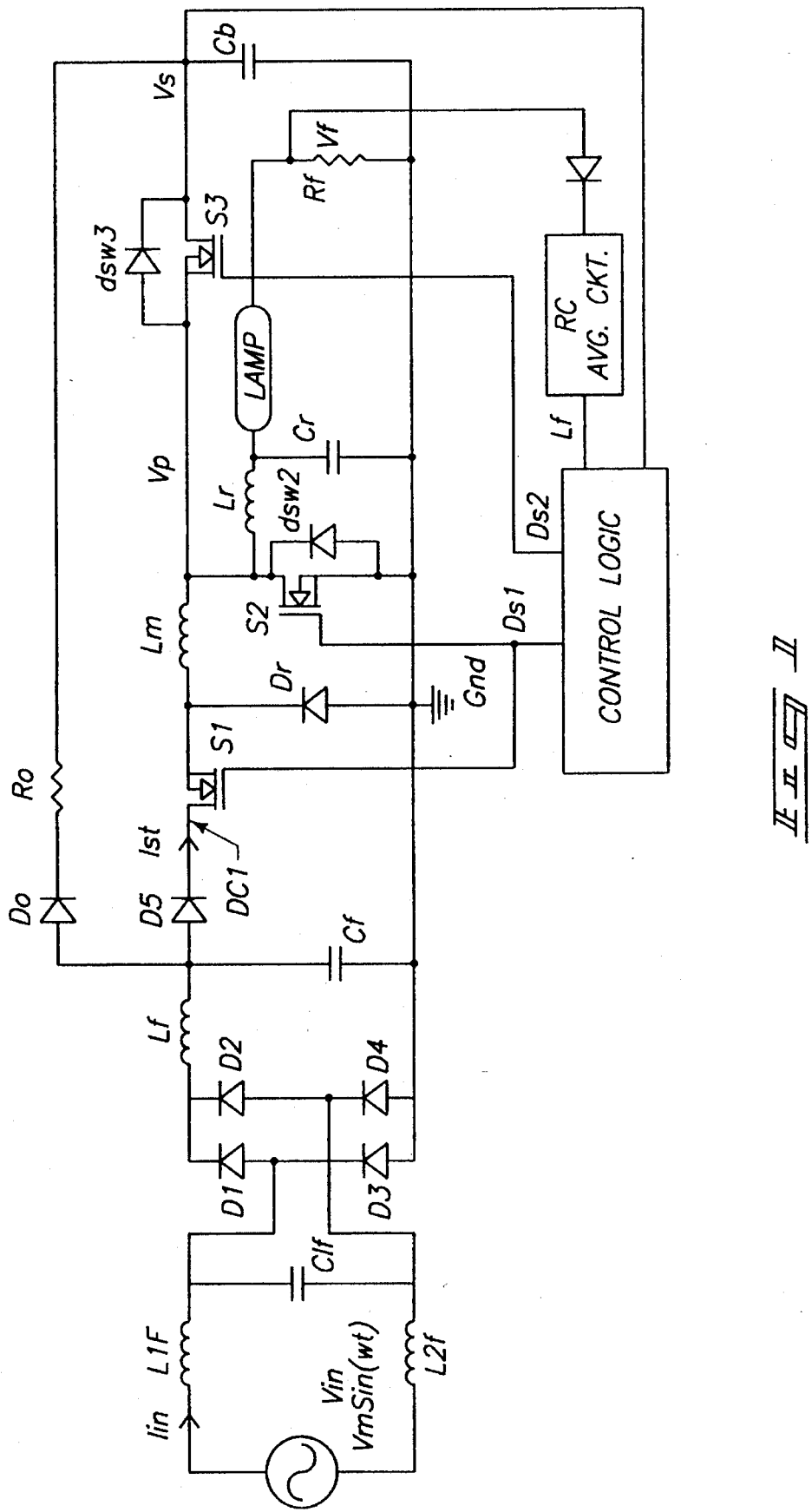
FIG. 1 is a circuit schematic illustrating a ballast embodying various of the features of the invention. The circuit shown in FIG. 1 provides for dimming of the fluorescent lamp. The circuit shown in FIG. 1 includes a control logic IC (integrated circuit).

Before the particular circuit configurations shown in the drawings are discussed in detail, a general description of how power factor is corrected, to provide a ballast having a substantially unity power factor, will be given. Referring to FIG. 1, in steady state operation at fixed switching frequency fsw, the peak current through a switch S1 in the ballast circuit is governed by the following equation:

$$Ipk=Vin*Ton/Lm$$

where Vin=Vm Sin(ωt), Vin is the peak input AC voltage, Ton is the on time of the switch S1, and Lm is the inductance of an energy storing inductor. The symbol "*" is used in the above equation, and in equations hereinafter, to indicate multiplication.

Because the inductance value Lm is constant, and Ton is controlled to be constant, Ipk, the current through the inductor Lm, is linearly proportional to the input voltage. Therefore, the average current Iin is tracking the input voltage Vin and in the form of sinusoidal waveform. This results in substantially unity power factor and low input current T.H.D. (total harmonic distortion). To maintain this operating condition the inductor current has to be in discontinuous mode. For the inductor current to be in discontinuous mode, where only one switch S1 is a control switch (as shown in FIG. 1) the duty cycle of switch S1 has to be:

$$d \leq 0.5/(1+Vm/Vs)$$

where Vs is the voltage across an energy storing capacitor Cb.

Where there are two switches S1 and S2, or three switches S1, S2, and S3 connected as shown in FIGS. 2–6, for the inductor current to be in discontinuous mode, the duty cycle of the switch S1 has to be:

$$d \leq 1.0/(1+Vm/Vs)$$

where Vs is the voltage across energy storing capacitor Cb shown in FIG. 1.

The input power is given by the following equation:

$$Pin=Vin*Iin=(Vm^2Ton^2fsw)/(4Lm)$$

The output power is given by the following equation:

$$Pout=K*(Vs^2)/R$$

where K is a constant multiplier.

Using these formulas, a decision can be made as to what the input power will be, and the value for the inductor Lm can be calculated.

The circuit shown in FIG. 1 employs the above determinations, and is adapted for use with a fluorescent lamp. In the circuit shown in FIG. 1, input AC is connected to a bridge rectifier comprising four diodes D1, D2, D3, and D4 which convert AC input voltage to rectified DC output voltage. A DC side EMI filter comprising of Lf and Cf is used to average the peak switching current. An optional AC side filter can also be added, or used instead of the DC side filter. In order to overcome the problem of slower rectifying diodes a fast diode D5 is advantageously employed in series with the EMI filter. The output DC1 from the filter is connected to switch S1. An inductor Lm, having an inductance value selected using the above equations, is placed between switch S1 and S2. A diode Dr is placed between GND and the emitter of switch S1.

The switches S1 and S2, the inductor Lm, the forward diode Dr, and the storage capacitor Cr complete a discontinuous buck-boost section of the circuit. The drive to S1 and S2 are tied together and are operated together to achieve the series operation of switches, by operating in this mode we can observe that the switch S1 rating is same as that of input voltage, and S2 rating depends on the pre-programmed bus voltage Vs.

The block in FIG. 1 labeled "CONTROL LOGIC" is a commercially available pulse width modulation circuit with complementary drive outputs (hereinafter "control logic circuit)". One suitable pulse width modulator is a SG 3525 integrated circuit. Various other integrated circuits can also be employed. The drive output Ds1 and Ds2 from the control circuit are complements of each other. The drive output Ds1 is a substantially square wave. The drive output Ds1 is also a substantially square wave. The duty cycle of Ds1 is the complement of the duty cycle of Ds2. These drives Ds1 and Ds2 are derived as a function of the lamp current feedback Lf. The lamp current is rectified and averaged with a RC network (labelled in FIG. 1 as RC. AVG. CKT.) to give a steady state feedback. This allows the drive output at Ds1 and Ds2 to be characterized as a function governed by the following equation:

$$Ds1,Ds2=f(Lf)|Vs<Vref$$

where Vs is the DC bus voltage.

The maximum DC bus voltage is pre-set by reference Vref, so if the capacitor voltage increases beyond the limit to accommodate a much smaller load, then the control logic circuit will disable or regulate the circuit operation.

The duty cycle of the output Ds2 of the control logic circuit is the complement of Ds1 or it can optionally be held constant at 50%.

The input AC voltage, after being rectified by the diode bridge D1, D2, D3, and D4, and after being filtered, is applied across switch S1 and S2 with the inductor Lm in between. Initially, when there is no energy stored in the capacitor Cr, the lamp feedback Lf and voltage feedback Vf is small hence the control unit drives switches S1, S2 and S3. Because S1 and S2 are tied together whenever they are turned on, the inductor Lm is connected across the filtered DC input Dc1 from the bridge, resulting in energy being stored in the inductor. When switch S3 is turned on, switches S1, and S2 are switched off resulting in the delivery of stored energy from inductor to the storage capacitor Cr and the fluorescent lamp load. The voltage at the output is determined by the value of Lm, and if the voltage across the storage capacitor Cr builds beyond a certain pre-set value then the duration of the Ds1 drive is reduced or turned off to safeguard or regulate the system.

The voltage Vp is varying between Vs, the voltage at storage capacitor Cr and GND in the form of square pulses. The RMS value of this voltage depends on the duration of drive Ds1. By changing the duration of Ds1, load power (at the fluorescent lamp) can be regulated. One or multiple tuned resonant elements connected between Vp and GND will resonate and provide the necessary starting voltage for starting oscillation and starting the fluorescent lamp. The inductor Lr and capacitor Cr constitute the resonant element, and operation of this resonant element depends on the fundamental value of Vp and the frequency of the output of the control logic circuit.

If the circuit is configured for close to 50% duty cycle on the Ds1 and Ds2 drive outputs, then we can replace the control logic circuitry with a self oscillating configuration and achieve the same results. This is shown in FIG. 2.

Figure 2:
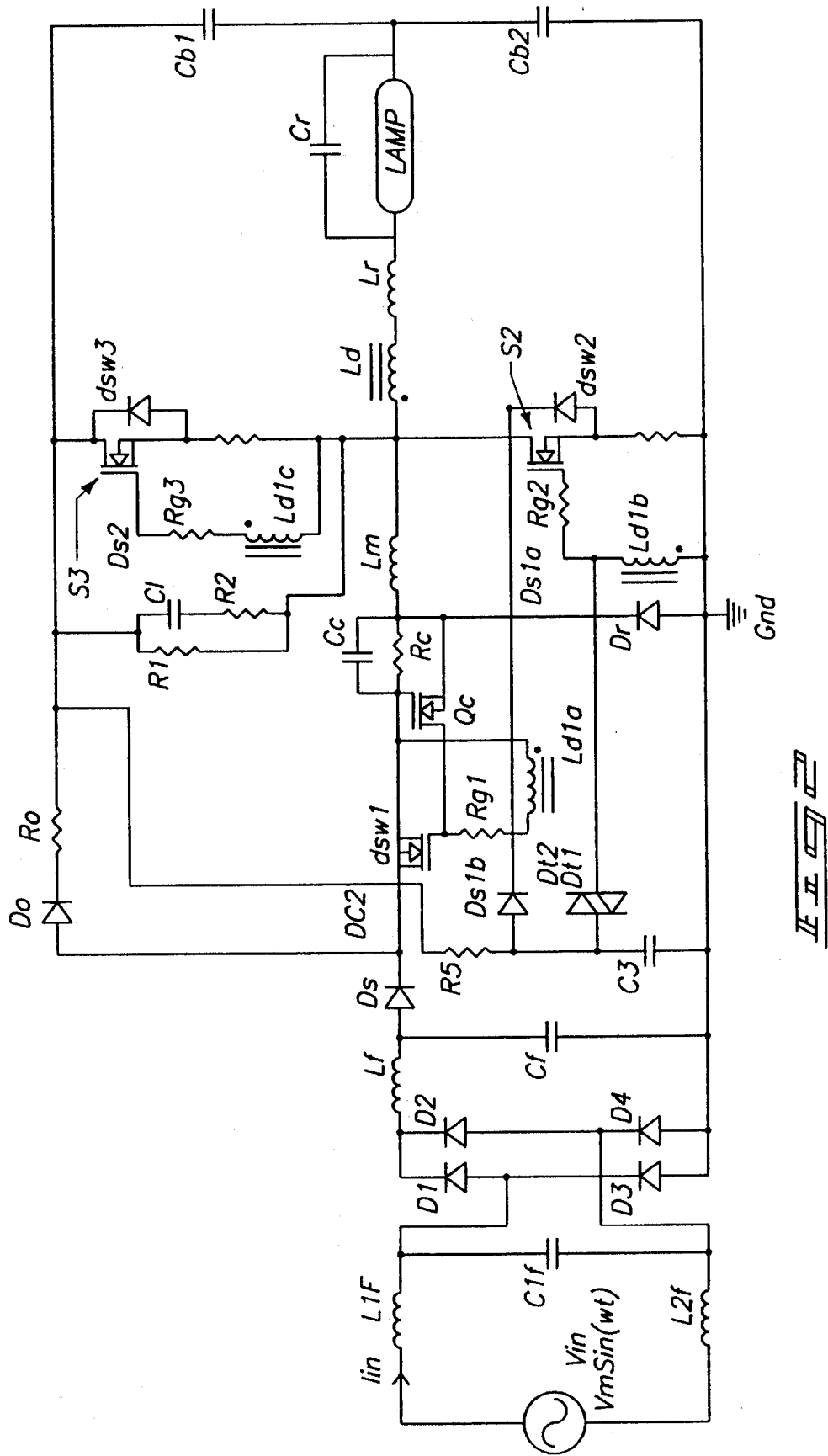
FIG. 2 is a circuit schematic illustrating a second ballast circuit including a transformer providing self oscillation, eliminating the need for the control logic IC includes in the circuit shown in FIG. 1.

In the circuit shown in FIG. 2, input AC is rectified using diodes D1, D2, D3 and D4, and input filter Lf and Cf is connected just like in the circuit shown in FIG. 1. The filtered DC voltage DC2 is connected to S1. Lm, the power factor correction inductor, is connected between S1 and S2. The self oscillating frequency of the system can be determined by the output resonant element Lr and Cr. This self oscillating frequency is dependent on the load which, in this case, is the lamp itself.

A driver transformer Ld is connected in series with the resonant element Lr and Cr. The three secondary windings of the transformer Ld are connected to S1, S2, and S3. The phase of the secondary winding connected to the switch S3 is the complement of the windings connected to S1 and S2.

Resistor Rs and Cs, connected between the output voltage Vs and GND, are employed to start the self oscillation. The center tap of the Rs, Cs charge tank is connected to a trigger device dt1, which can be a diac. Whenever the potential on the capacitor Cs exceeds the breakdown voltage of the trigger device the device turns on releasing Cs charge into the S2 base. A diode and series resistor connected from Dc2 to output capacitor Cb1,Cb2 helps to transfer initial charge to give substantial voltage for starting.

The diode Dt2 is connected to the center of the RC tank and connected to the center tap of the switches S2 and S3. Whenever the trigger device conducts, the switch S2 is turned ON, and this will initiate a resonance using Lr, Cr and the lamp impedance. The current through the driver transformer primary winding induces complementary drive signals Ds1$b$ and Ds2. The drive signal Ds1$a$ drives switch S2; the drive signal Ds1$b$ drives the switch S1; and the drive signal Ds2 drives switch S3.

Because Ds1$a$ and Ds1$b$ are of the same phase, the switch S1 and S2 turn on together at 50% duty cycle to operate as a buck-boost regulator in discontinuous mode. Whenever the lamp fails the standby resistor capacitor network R1, R2 and C1 determine that the operating frequency which is much lower than the normal operation. The resonant capacitor Cr could be the load capacitance itself, in which case the inverter will have just Lr.

As is evident from the power equation defined earlier, in case of self oscillating circuits of this topology, power changes by $K*Vs^2$. In order to regulate the power we can place a resistor Rc in series with the switch, and sensing the voltage across this resistor we can use a low voltage switch Qc to turn off the drive to series switch S1. By employing this mode of duty cycle control on the input stage we can regulate power without adding any additional control circuitry.

In cases where it is desirable to use switches with lower current ratings, (such as to reduce cost in a ballast included in a disposable lamp assembly package for residential use), then we can use two switches to achieve the same operation. This is shown in FIG. 3.

Figure 3:
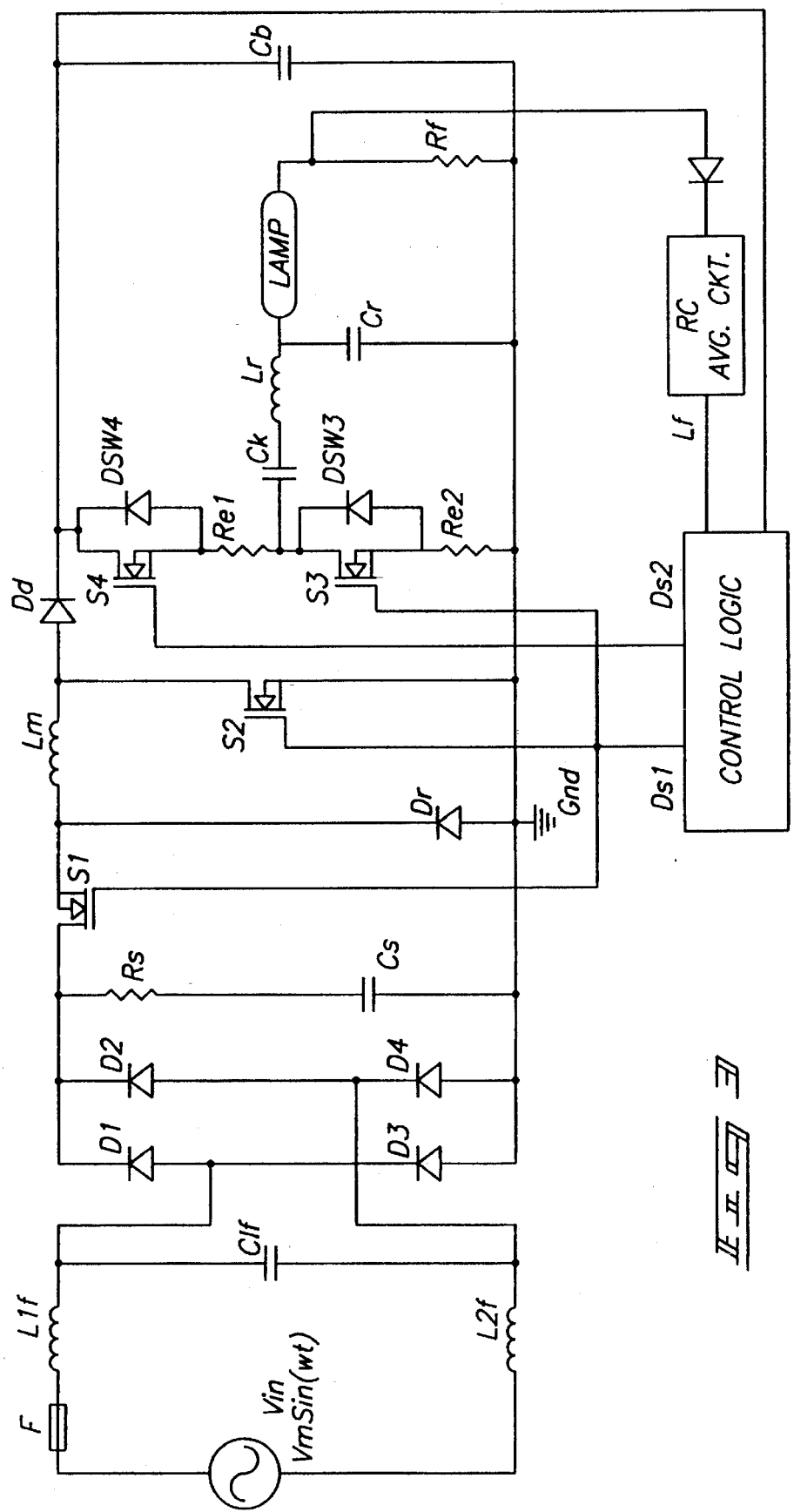
FIG. 3 is a circuit schematic illustrating a third ballast circuit including four switches, which allows switches with lower current ratings to be employed.
Figure 4:
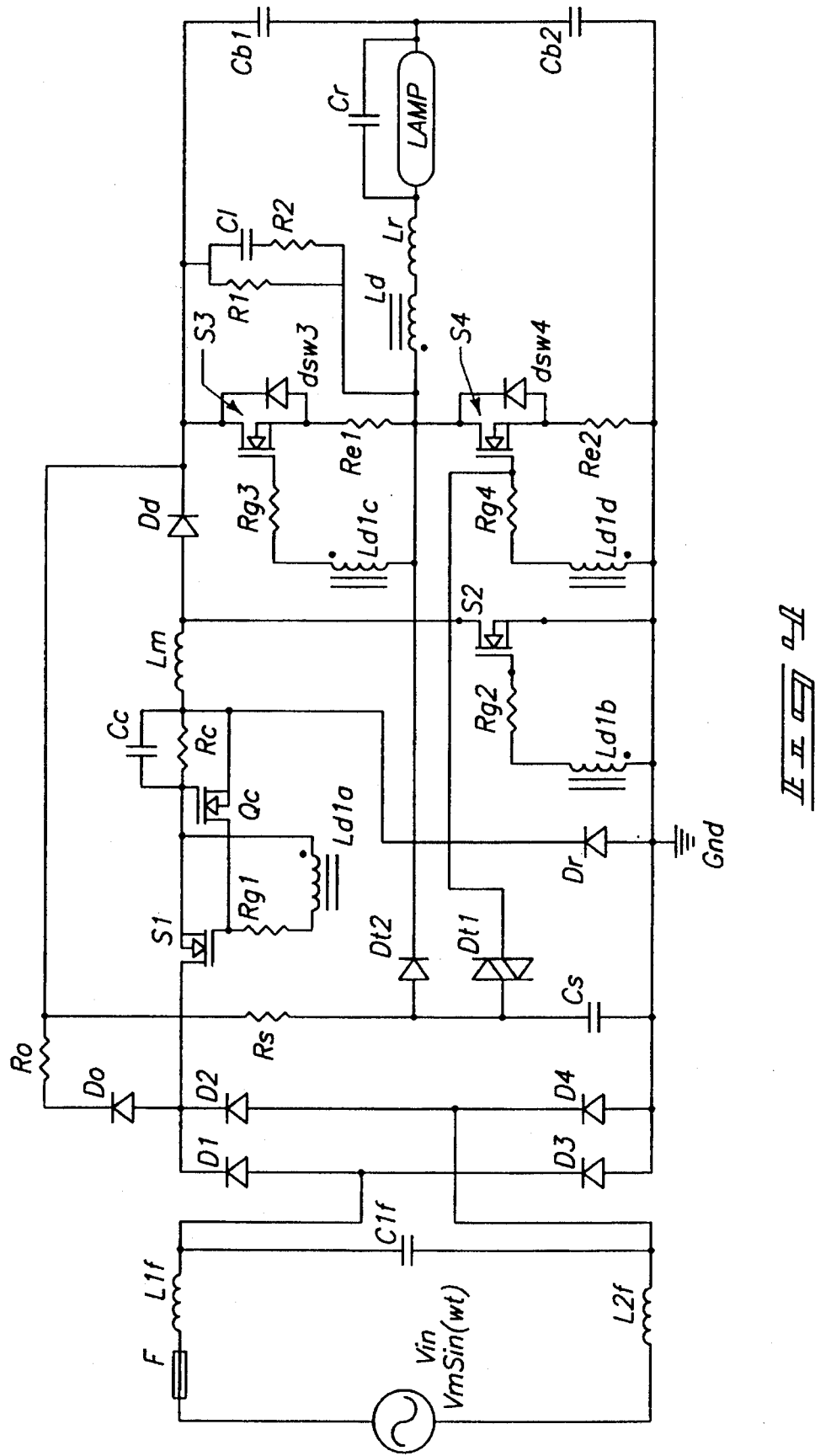
FIG. 4 is a circuit schematic illustrating a fourth ballast circuit, which is similar to the circuit shown in FIG. 3, but which includes a transformer providing for self oscillation mode.

The circuit shown in FIG. 3 includes four switches, where switches S2 and S3 together achieve the same function as that of switch S2 in FIG. 1. This switch combination can also be extended to self oscillation mode, using a transformer as shown in FIG. 4, where the drive for switches S1, S2 and S4 are in the same phase.

Figure 5:
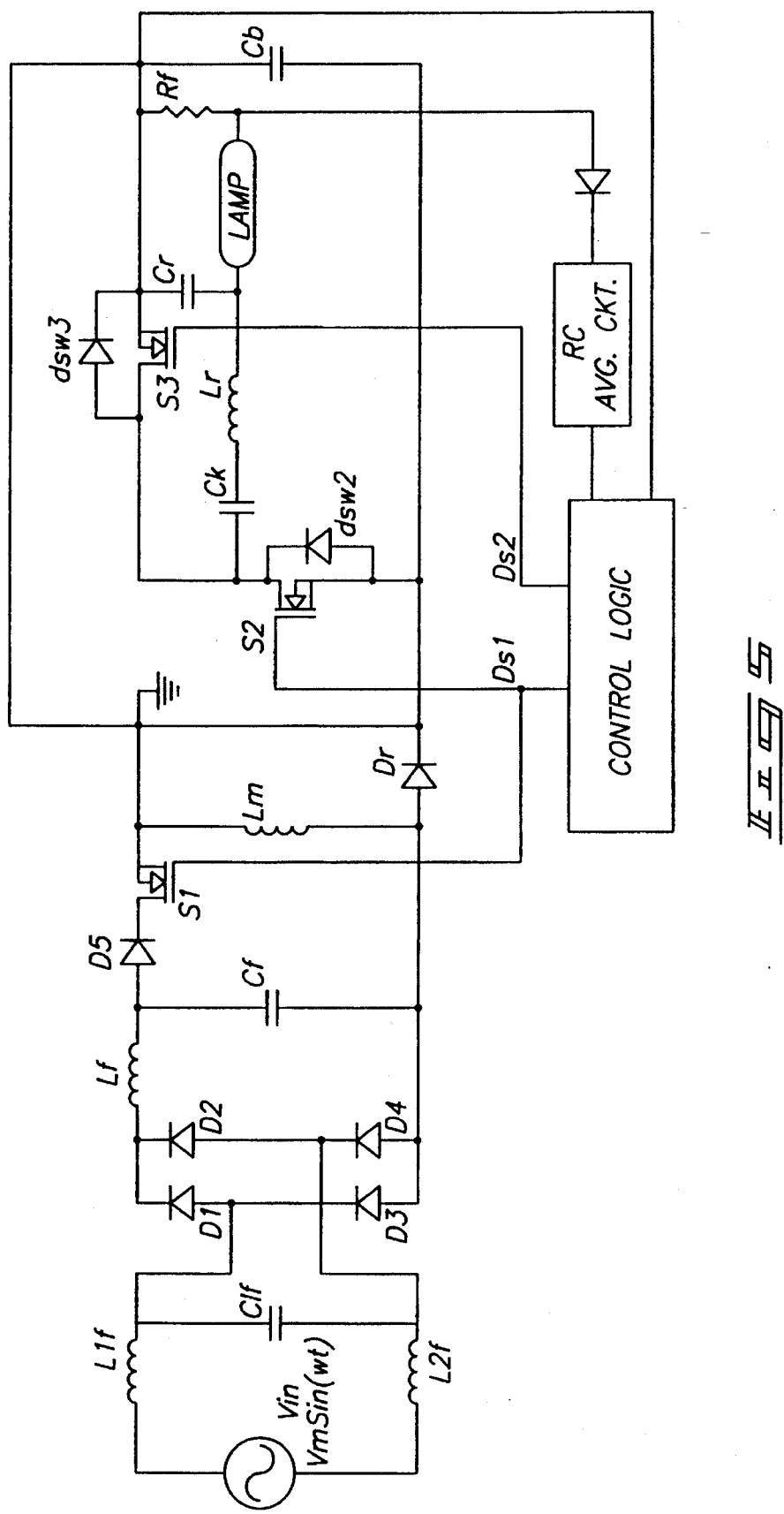
FIG. 5 is a circuit schematic illustrating a fifth ballast circuit, which includes a buck-boost circuit that achieves the function of the present invention.
Figure 6:
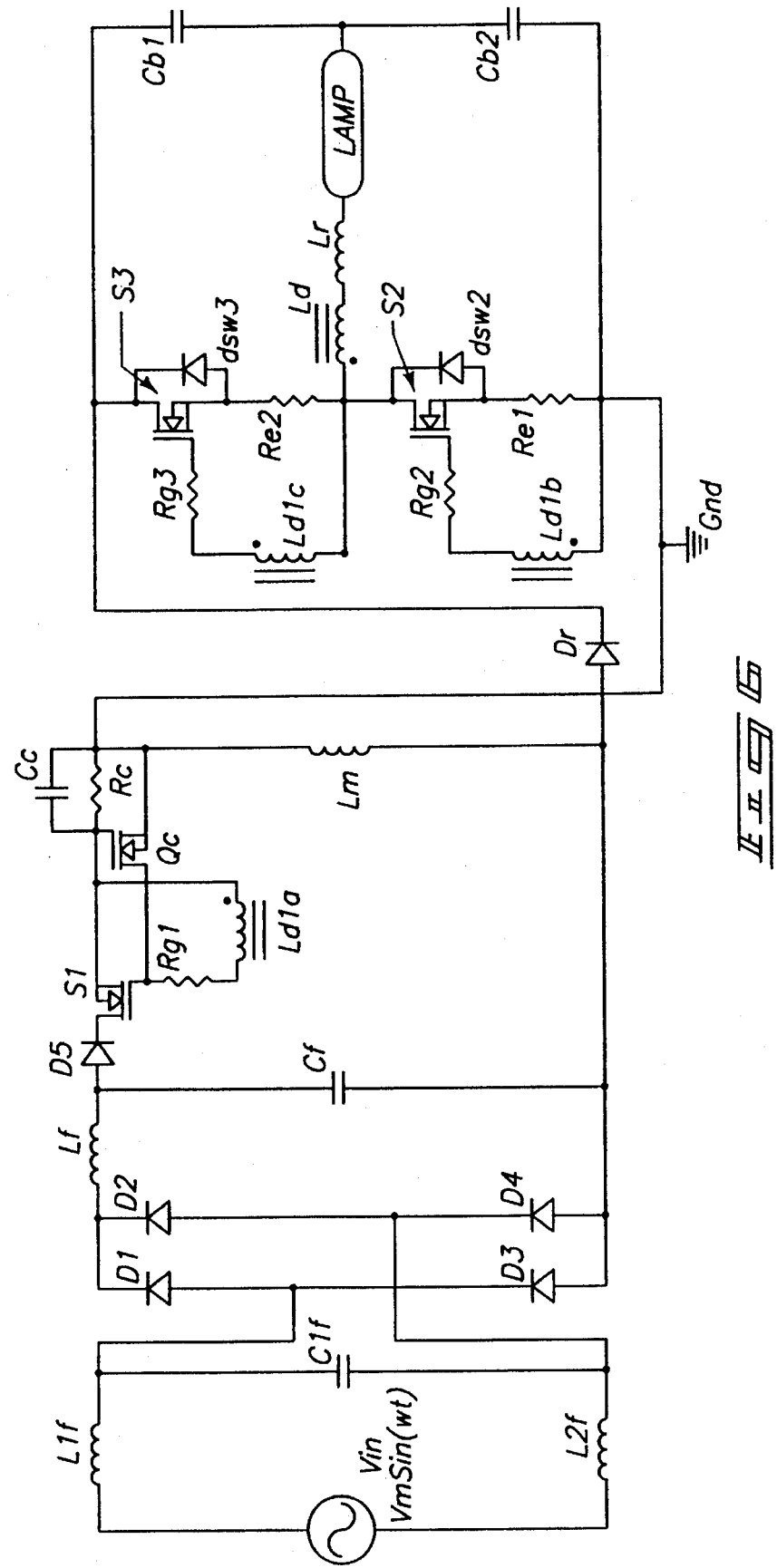
FIG. 6 is a circuit schematic illustrating a sixth ballast circuit which includes a buck-boost regulator to achieve the function of a ballast in self oscillation mode.
Figure 7:
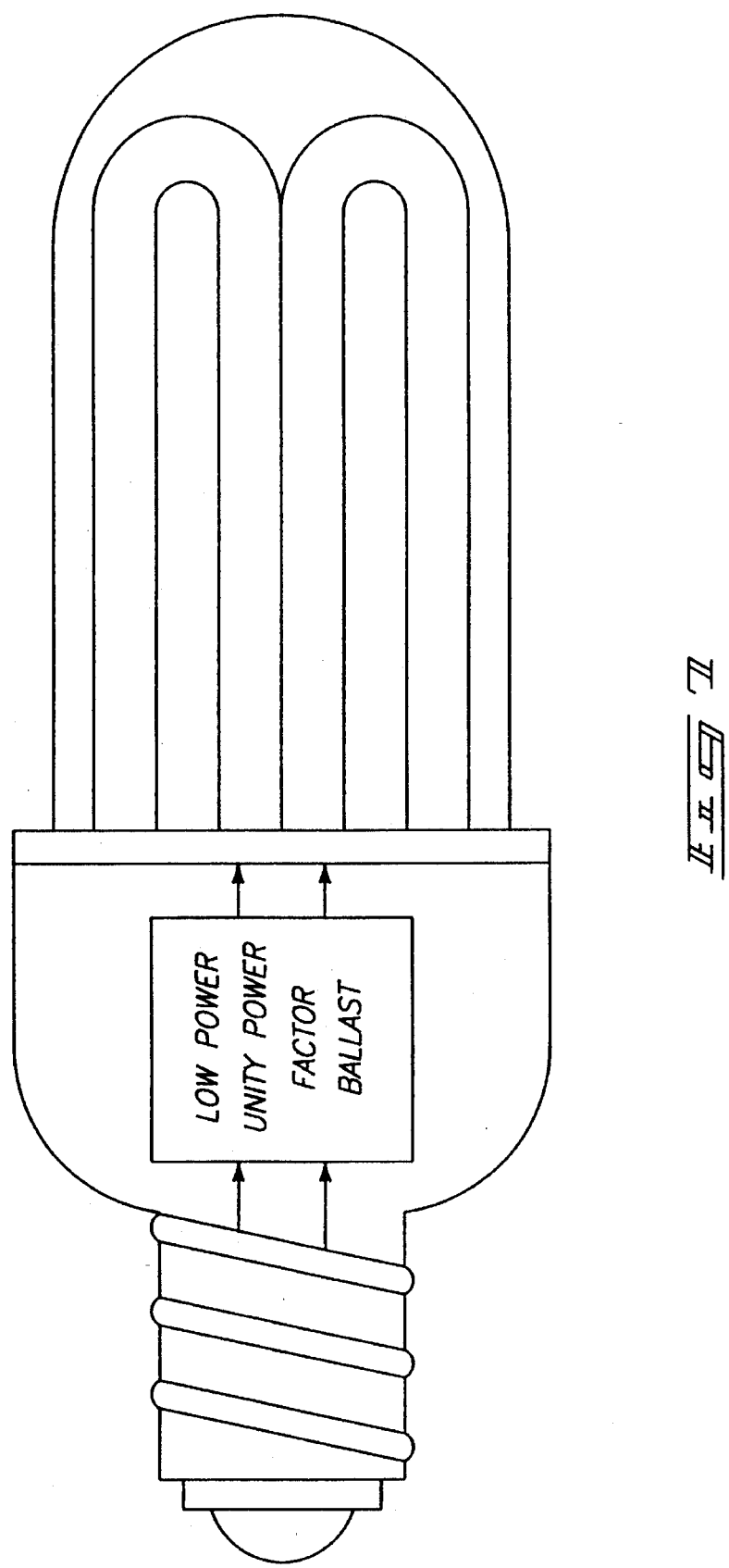
FIG. 7 illustrates a lamp assembly including a fluorescent lamp and a ballast circuit encased in a housing extending from a screw in type base.

The switch utilization of S1 in series with S2 to operate in higher input voltage environment is ideal and this combination can sustain line transients. In cases when the input voltage is not substantially large (e.g., residential applications), the circuits shown in FIGS. 5 and 6 can be employed without the concern for needing (more expensive) switches with high current ratings. The circuits shown in FIGS. 5 and 6 use single switch conversion in self oscillating or driven mode, where the discontinuous power factor correction inductor Lm is connected between S1 emitter and diode Dr. The storage capacitor is connected in series with S1 and the switch S3. The drive for S1 and S2 are tied together and are operated in the similar way explained for FIGS. 2 and 3. Whenever S1 is turned on, Lm stores energy derived from line supply. Diode d1 will transfer this energy to the storage capacitor when S1 is turned off. The operation of the inverter for FIG. 4 is similar to the operation of the invertor explained with regard to the circuit of FIG. 1. The operation of the invertor for FIG. 5 is similar to the operation of the invertor explained with regard to the circuit of FIG. 2.

Therefore, a ballast circuit has been disclosed with provides cost savings by allowing use of switches and capacitors having lower ratings. A ballast circuit has also been disclosed having close to unity power factor, and that does not produce undesirable harmonic distortion. A ballast circuit having discontinuous buck boost power factor correction, and lamp dimming capabilities has also been disclosed.

Modifications may be made to the preferred embodiment described and illustrated herein without departing from the spirit of the invention as expressed in the following claims. For example, while the ballast circuits disclosed herein can be advantageously employed in an encapsulated package housing a fluorescent lamp and the ballast circuit, and having an Edison base; or advantageously employed in an adaptor for a two pin lamp, having an Edison base, it should be kept in mind that the ballast circuits disclosed herein can be employed with more traditional fluorescent lamp applications, such as in office buildings or warehouse space, where the Edison base is not required.

We claim:

1. An electronic ballast for operating a fluorescent lamp, and adapted to be used with an AC power supply, said ballast comprising:

rectifier means, adapted to be connected to the AC power supply, for converting AC to a DC voltage, said rectifier means having a positive DC output terminal and a negative DC output terminal;

a control circuit means having first and second outputs and providing complementary square waves on the respective outputs;

buck boost circuitry means including an inductor having first and second ends, a first switch connected between said positive DC output terminal of said rectifier means and said first end of said inductor, said first switch being controlled by said first output of said control circuit means, a diode connected between said negative DC output terminal of said rectifier means and said first end of said inductor, and a second switch connected between said second end of said inductor and said negative DC output terminal of said rectifier means, said second switch also being controlled by the same square wave output at said first output of said control circuit means that controls said first switch;

means for connecting a fluorescent lamp having first and second ends such that said first end of the fluorescent lamp is adapted to be connected to said second end of said inductor, with said second switch connected between said first end of the fluorescent lamp and said negative DC output terminal of said rectifier means, and such that said second end of said fluorescent lamp is adapted to be connected to said negative DC output terminal of said rectifier means; and a third switch connected between said second end of said inductor and said negative DC output terminal of said rectifier means, and controlled by said second output of said control circuit means;

wherein energy is stored in said inductor when said first and second switches are turned on, and energy stored in said inductor is delivered to the lamp when said third switch is turned on.

2. An electronic ballast in accordance with claim 1 wherein said inductor provides power factor correction.

3. An electronic ballast for operating a fluorescent lamp, and adapted to be used with an AC power supply, said ballast comprising:

rectifier means, adapted to be connected to the AC power supply, for converting AC to a DC voltage, said rectifier means having a positive DC output terminal and a negative DC output terminal;

transformer means arranged in self oscillation mode, and providing first and second complementary drive signals;

buck boost circuitry means including an inductor having first and second ends, a first switch connected between said positive DC output terminal of said rectifier means and said first end of said inductor, said first switch being controlled by said first drive signal, a diode connected between said negative DC output terminal of said rectifier means and said first end of said inductor, and a second switch connected between said second end of said inductor and said negative DC output terminal of said rectifier means, said second switch also being controlled by said first drive signal;

means for connecting a fluorescent lamp having first and second ends such that said first end of the fluorescent lamp is adapted to be connected to said second end of said inductor, with said second switch connected between said first end of the fluorescent lamp and said negative DC output terminal of said rectifier means, and such that said second end of said fluorescent lamp is adapted to be connected to said negative DC output terminal of said rectifier means; and a third switch connected between said second end of said inductor and said negative DC output terminal of said rectifier means, and controlled by said second output of said control circuit means, wherein energy is stored in said inductor when said first and second switches are turned on, and energy stored in said inductor is delivered to the lamp when said third switch is turned on.

4. An electronic ballast in accordance with claim 1 wherein said inductor provides power factor correction.

5. An electronic ballast and fluorescent lamp assembly, adapted to be used with an AC power supply, said assembly comprising:

a rectifier, adapted to be connected to the AC power supply, for converting AC to a DC voltage, said rectifier having a positive DC output terminal and a negative DC output terminal;

a control circuit having first and second outputs and providing complementary square waves on the respective outputs;

buck boost circuitry including an inductor having first and second ends, a first switch connected between said positive DC output terminal of said rectifier and said first end of said inductor, said first switch being controlled by said first output of said control circuit, a diode connected between said negative DC output terminal of said rectifier and said first end of said inductor, and a second switch connected between said second end of said inductor and said negative DC output terminal of said rectifier, said second switch also being controlled by the same square wave output at said first output of said control circuit that controls said first switch;

a second inductor having a first end connected to said second end of said first mentioned induction, and having a second end;

a capacitor connected between said second end of said second inductor and said negative DC output terminal of said rectifier;

a fluorescent lamp having first and second ends such that said first end of the fluorescent lamp is connected to said second end of said second inductor, with said second switch connected between said first end of the fluorescent lamp and said negative DC output terminal of said rectifier, and such that said second end of said fluorescent lamp is connected to said negative DC output terminal of said rectifier; and a third switch connected between said second end of said inductor and said negative DC output terminal of said rectifier, and controlled by said second output of said control circuit.

6. An electronic ballast and fluorescent lamp assembly, adapted to be used with an AC power supply, said assembly comprising:

a rectifier, adapted to be connected to the AC power supply, for converting AC to a DC voltage, said rectifier having a positive DC output terminal and a negative DC output terminal;

a transformer arranged in self oscillation mode, and providing first and second complementary drive signals;

buck boost circuitry including an inductor having first and second ends, a first switch connected between said positive DC output terminal of said rectifier and said first end of said inductor, said first switch being controlled by said first drive signal, a diode connected between said negative DC output terminal of said rectifier and said first end of said inductor, and a second switch connected between said second end of said inductor and said negative DC output terminal of said rectifier, said second switch also being controlled by said first drive signal;

a second inductor having a first end connected to said second end of said first mentioned induction, and having a second end;

a fluorescent lamp having first and second ends such that said first end of the fluorescent lamp is connected to said second end of said second inductor, with said second switch connected between said first end of the fluorescent lamp and said negative DC output terminal of said rectifier means, and such that said second end of said fluorescent lamp is connected to said negative DC output terminal of said rectifier;

a capacitor connected parallel to said fluorescent lamp; and a third switch connected between said second end of said inductor and said negative DC output terminal of said rectifier, and controlled by said second output of said control circuit.

7. An electronic ballast for operating a fluorescent lamp, and adapted to be used with an AC power supply, said ballast comprising:

rectifier means, adapted to be connected to the AC power supply, for converting AC to a DC voltage, said rectifier means having a positive DC output terminal and a negative DC output terminal;

a control circuit means having first and second outputs and providing complementary square waves on the respective outputs;

circuitry means including an inductor having first and second ends, a first switch connected between said positive DC output terminal of said rectifier means and said first end of said inductor, said first switch being controlled by said first output of said control circuit means, a diode connected between said negative DC output terminal of said rectifier means and said first end of said inductor, and a second switch connected between said second end of said inductor and said negative DC output terminal of said rectifier means, said second switch also being controlled by the same square wave output at said first output of said control circuit means that controls said first switch;

a third switch having a first end connected to said second end of said inductor, having a second end, and controlled by said second output of said control circuit means;

a fourth switch connected between said second end of said third switch and said negative DC output terminal of said rectifier means, and controlled by said first output of said control circuit means; and means for connecting a fluorescent lamp having first and second ends such that said first end of the fluorescent lamp is adapted to be connected to said second end of said third switch, and such that said second end of said fluorescent lamp is adapted to be connected to said negative DC output terminal of said rectifier means.

8. An electronic ballast for operating a fluorescent lamp, and adapted to be used with an AC power supply, said ballast comprising:

rectifier means, adapted to be connected to the AC power supply, for converting AC to a DC voltage, said rectifier means having a positive DC output terminal and a negative DC output terminal;

transformer means arranged in self oscillation mode, and providing first and second complementary drive signals;

circuitry means including an inductor having first and second ends, a first switch connected between said positive DC output terminal of said rectifier means and said first end of said inductor, said first switch being controlled by said first drive signal of said transformer means, a diode connected between said negative DC output terminal of said rectifier means and said first end of said inductor, and a second switch connected between said second end of said inductor and said negative DC output terminal of said rectifier means, said second switch being controlled by said first drive signal of said transformer means;

a third switch having a first: end connected to said second end of said inductor, having a second end, and controlled by said second drive signal of said transformer means;

a fourth switch connected between said second end of said third switch and said negative DC output terminal of said rectifier means, and controlled by said first drive signal of said transformer means; and means for connecting a fluorescent lamp having first and second ends such that said first end of the fluorescent lamp is adapted to be connected to said second end of said third switch, and such that said second end of said fluorescent lamp is adapted to be connected to said negative DC output terminal of said rectifier means.

* * * * *